3,799,815
COLORING OF ALUMINUM AND ITS ALLOYS
Coimbatore V. Subramaniam, 443 S. Alexandria, Apt. 7, Los Angeles, Calif. 90020
No Drawing. Filed Dec. 15, 1971, Ser. No. 208,439
Int. Cl. C23f 7/02
U.S. Cl. 148—6.27                                          11 Claims

ABSTRACT OF THE DISCLOSURE

An improved method of coloring aluminum or its alloys by the use of an aqueous coloring bath of an alkaline pH containing a chemical of the chromophore or auxochrome groups or a combination of both.

---

This invention describes a nonelectrolytic process of coloring of aluminum and its alloys by conversion coating method in an aqueous solution of chemical(s) with chromophore groups such as C=C, C=O, C—O—C, N—C, and $NO_2$ or chemical(s) with auxochrome groups such as OH, NH and $NH_2$ are chemical(s) with both chromophore and auxochrome groups under specified reaction conditions.

There are a few conversion coating methods whose main objective is to impart a protective coating with decorative appeal to aluminum and its alloys. Some of the available processes even require electrical energy. These processes are considerably costly. It is the objective of this invention to color aluminum and its alloys in a cheaper way then the other available processes. The color obtained varies according to the nature of alloy, impurities present in the alloy and its surface conditions and therefore the colors obtained are not generalized.

In describing the invention, the following glossary and abbreviations are used:

Colorant A: A chemical with chromophore(s).
Colorant B: A chemical with auxochrome(s).
Colorant C: A chemical with chromophore(s) and auxochrome(s).
Colorant: Colorant A or Colorant B or Colorant C or combination of the aforesaid chemicals. Examples are in Table II.
Substrate: An article, which is to be colored, made out of of aluminum or an alloy in which aluminum is present.
pH is adjusted: pH of an aqueous solution of colorant is adjusted with an alkali such as KOH, NaOH, amine(s), aminohydroxy compound(s), quaternary ammonium compound(s) or combinations of the aforesaid compounds.
Percentages: All percentages are by weight and are calculated by equation (Process formula component/(process formula component+water))=Percentage.
LC/PFC: Limits of concentrations of process formula component.
LT/PS: Limits of temperatures of process solution.
LT/DS: Limits of time periods in minutes for dipping the substrate in process solution.
PC/PFC: Preferred concentration of process formula component.
PT/PS: Preferred temperature of process (formula) solution.
PT/DS: Preferred time period in minutes for dipping the substrate in process solution.
Alkali: Organic or inorganic in nature. Examples are KOH, NaOH, amine(s), aminohydroxy compounds, quaternary ammonium salts or combinations thereof.
Acid: Organic or inorganic in nature. Examples are sulphuric, oxalic, nitric, hydrochloric, perchloric, citric, picric, sulfophthalic, and sulfamic acid. Compounds such as oxalates are also included.

The general process is described in Table I and the substrate is carried through the steps mentioned in the said table:

TABLE I.—COLORING PROCESS

| Step | PFC | Percent | | ° F. | | | |
|---|---|---|---|---|---|---|---|
| | | LC/PFC | PC/PFC | LT/PS | PT/PS | LT/DS | PT/DS |
| #1 Clean | Soap | 5–20 | 10 | 100–200 | 140 | 5.0'–20' | 10' |
| #2 Etch | Alkali | 1–20 | 5 | 100–200 | 150 | 1.0'–10' | 2'–5' |
| #3 Rinse | Water | 100 | 100 | 75–150 | 100 | 0.5'–5' | 2' |
| #4 Neutralize | Acid | 5–20 | 10 | 75–100 | 77 | 0.3'–2' | 1' |
| #5 Rinse | Water | 100 | 100 | 75–150 | 100 | 0.5'–5' | 2' |
| #6 Etch | Alkali | 1–20 | 5 | 100–200 | 150 | 1.0'–10' | 2'–5' |
| #7 Rinse | Water | 100 | 100 | 75–150 | 100 | 0.5'–5' | 2' |
| #8 Coloring | Colorant (pH is adjusted [1]) | 0.1–50.0 | 1 | 75–200 | 100–150 | ([2]) | ([2]) |
| #9 Rinse | Water | 100 | 100 | 75–150 | 100 | 0.5'–5' | 2' |
| #10 Neutralize | Acid | 5–20 | 10 | 75–100 | 77 | 0.1'–3' | 0.10' |
| #11 Rinse | Water | 100 | 100 | 75–150 | 100 | 0.1'–5' | 1'–3' |
| #12 | Substrate is coated with custom formulated plastic | | | | | | |

[1] pH is adjusted to a range of from 8 to 13 but preferably to a range of from 9 to 10.
[2] Varies with substrate.

Following is a detailed description of each step mentioned in Table I.

Step #1: The objective of this step is to free the substrate from any foreign material adhering to the substrate. There are quite a number of commercial processes to clean the aluminum substrates and any one of them may be used. But from economical point of view, it is satisfactory to clean the substrates by simply dipping them in an aqueous soap solution while the soap solution is agitated.

Step #2: This step removes the foreign material which is not removed in step #1. Alkalis such as potassium hydroxide, sodium hydroxide, tetraethyl ammonium hydroxide, aminohydroxy compounds, quaternary salts or combinations of the aforesaid chemicals are satisfactory. Substrates may get colored right in this step depending upon the colorants present in this solution. During this step an aluminate is formed on the substrate.

Step #3: The alkali action on the substrate is stopped and part of the aluminate is removed.

Step #4: The aluminate formed in step #2 and not removed in step #3 neutralized with an acid. Acids may be of organic or inorganic in nature. Examples are oxalic, picric, citric, sulfophthalic, sulfamic, maleic, sulfuric, nitric, hydrochloric, perchloric acids and salts of the said acids are satisfactory.

Step #5: The substrate is freed from acid.

Step #6: The substrate is re-etched in the said alkalis. In many cases, the aluminate formed in this step works as catalyst in step #8 and in some cases, the said aluminate directly participates in coloring reaction.

Step #7: The alkali reaction on the substrate is stopped. To get uniform color on the substrate, water should not be forced on the substrate so as to remove the aluminate on the said substrate.

Step #8: This is the coloring step. During this step, the aluminum in the substrate reacts with the chromophore(s) and auxochromes of the formula solution so as to form a decorative color on the substrate. Presence of aluminate on the said substrate usually accelerates the coloring reaction. The process solution is made by dissolving the said colorants in water in the concentration range of 0.1% to 50% by preferably 1%. When the colorant is insoluble in water, the colorant must first be dissolved in a suitable solvent which is compatible with water. As an example, phenolpthalein (colorant) must be first dissolved in alcohol and then mixed with water. The amount of the said solvent is not included in the percentages given. pH of the process solution of this step must be brought into the range of from 8 to 13 but preferably into the range of 9 to 10 by using an alkali such as KOH, NaOH, amine, aminohydroxy compound, quaternary salt or combinations thereof. It is preferable to use "another colorant" which will also serve as an alkali to adjust pH. An example of "another colorant" is aminohydroxy compound. Some examples of colorants are given in Table II. The compounds formed during coloring reaction are believed to have the following chemical formulas:

$$R-O-Al=O, (RNH)_3Al, (RR'N)_3Al, (RN)_3Al_2$$

where R and R' are hydrogens or monovalent organic groups. The time of immersion of the substrate in the process solution depends upon the color and shade desired and also on the nature of alloy of the substrate. Many alloys contain impurities in various quantities and these impurities effect the color. However, to mention an example, a time period of 1 minute to 300 minutes is satisfactory but may even range up to 200 hours.

Step #9: The substrate is rinsed in water to stop the coloring reaction.

Step #10: The substrate is rinsed in an acid solution. Acids such as those given in step #4 are satisfactory.

Step #11: The substrate is again rinsed in water to remove traces of acid.

Step #12: The substrate is coated with custom formulated plastic.

Another way of coloring the substrate is by omitting steps 6, 7, 10 and 11.

Following is a list of colorants used in the process. Selection and combination of colorants (if necessary) depends upon the nature of the substrate.

TABLE II.—COLORANTS

| Chemical category Example Examples | Chromophore(s) | Auxochrome(s) |
|---|---|---|
| Alcohols: | | |
| Vinyl alcohol | C=C | OH |
| Methanol | | OH |
| Ethanol | | OH |
| Propanol | | OH |
| Butanol | | OH |
| Glycerol | | OH |
| Ethylene glycol | | OH |
| Benzyl alcohol | | OH |
| Amines: | | |
| Hydroxylamine | N—C | OH and NH₂ |
| Ethylamine | N—C | NH₂ |
| Diethylamine | N—C | NH |
| Triethylamine | N—C | |
| n-Methyl glucamine | N—C | OH and NH |
| Aminohydroxy compounds: | | |
| 2-amino-1-butanol | N—C | OH and NH₂ |
| 2-amino-2-methyl-1-propanol | N—C | OH and NH₂ |
| 2-amino-2-methyl-1,3-propanediol | N—C | OH and NH₂ |
| 2-amino-2-ethyl-1,3-propanediol | N—C | OH and NH₂ |
| Tris(hydroxymethyl) aminomethane | N—C | OH and NH₂ |
| Tetraethyl ammonium hydroxide | N—C | OH |
| Tetrabutyl ammonium hydroxide | N—C | OH |
| Tetra alky ammonium hydroxides | N—C | OH |
| Amides: | | |
| Urea | C=O | NH₂ |
| Acetamide | C=O | NH₂ |

TABLE II—Continued

| Chemical category Example Examples | Chromophore(s) | Auxochrome(s) |
|---|---|---|
| Aldehydes: | | |
| Formaldehyde | C=O | |
| Glucose | C=O | OH |
| Fructose | C=O | OH |
| Quinones: | | |
| Benzoquinone | C=C and C=O | |
| Hydroquinone | C=C | OH |
| Phenolpthalein | C=C and C=O | OH |
| Ethers: | | |
| Ethylene glycol mono-butyl ether | C—O—C | OH |
| Diethylene glycol mono-butyl ether | C—O—C | OH |
| Ethylene glycol mono-methyl ether | C—O—C | OH |
| Carboxylic acids: | | |
| Formic acid | C=O | OH |
| Acetic acid | C=O | OH |
| Picric acid | N—C and NO₂ | |
| Esters: | | |
| Methyl acetate | C—O—C and C=O | |
| Ethyl acetate | C—O—C and C=O | |
| Ketones: | | |
| Methyl ethyl ketone | C=O | |
| Acetone | C=O | |

Caution must be exercised in step #10. This step brightens the surface of the substrate and certain acids may take off the color when dipped for prolonged time. This phenonemon depends upon the colarant used. To give an example, when formaldehyde is colorant in step #8 and chromic acid is the acid in step #10, chromic acid may take off the color when the substrate is dipped for 10 seconds in the said acid. The limits of time periods and preferred time period for step #10 are given for guidance only and it must be understood these periods must be determined to suit the specific conditions of colorant(s), acids, and substrate.

Although I described a preferred embodiment of my invention, I do not wish to be restricted to exact compositions and chemicals and chemical categories, as many chemicals can be described in many ways, without departing from the spirit and scope of the invention.

What I claim as new and desire to secure by Letters Patent of United States is:

1. Process for coloring aluminum and its alloys comprising:
    treating a surface to be colored to remove foreign material and to provide a clean surface;
    dipping the clean surface into an aqueous coloring bath containing a solubilized colorant material at a concentration of about 0.1 to about 50% by weight, and
    maintaining the surface in the coloring bath at a temperature of about 75 to about 200° F. for a time period sufficient to produce a color change in the treated surface with the pH of the coloring bath ranging from about 8 to about 13, and the colorant material comprising a chemical which contains a chromophore group, an auxochrome group, or a combination of chromophore and auxochrome groups.

2. The process of claim 1 including the step of etching the surface to be colored before the surface is dipped in the coloring bath, said etching treatment comprising treating the surface to be colored with a solution containing from about one to about 20% by weight of alkali at a temperature of about 100 to about 200° F. for about 1 to about 10 minutes, and
    neutralizing the surface after its treatment in the coloring bath by treating the surface with a solution containing from about 5 to about 20% by weight of an acid at a temperature of about 75 to about 100° F. for a time period of about 0.1 to about 3 minutes.

3. The process of claim 1 wherein the colorant is an alcohol, an amine, an amino-hydroxy compound, an amide, an aldehyde, a quinone, an ether, a carboxylic acid, an ester, a ketone, or a material resulting from a combination of any of the said colorant materials.

4. The process of claim 3 wherein the colorant contains a chromophore group which is (C=C), (N—C), (C=O), (C—O—C), or (NO$_2$) or an auxochrome group which is (OH), (NH) or (NH$_2$) or a mixture thereof.

5. The process of claim 1 wherein the surface coating formed on the aluminum or the aluminum alloy has the formula R—O—Al=O, (RNH)$_3$Al, (RR$^1$N)$_3$Al or (RN)$_3$Al$_2$ where R and R$^1$ are hydrogen or monovalent organic groups.

6. The process of claim 1 wherein the colorant material is soluble in water.

7. The process of claim 1 wherein the colorant material is insoluble in water and including the step of solubilizing said colorant material by first dissolving the colorant material in a solvent which is compatible with water and then admixing the solvent and dissolved colorant material with water.

8. The process of claim 1 wherein the colorant material contains a hydroxyl group.

9. The process of claim 1 wherein the temperature of the coloring bath ranges from about 100 to about 150° F.

10. The process of claim 1 wherein colorant material is organic.

11. The process of claim 1 wherein the concentration of the colorant material is about one percent by weight.

References Cited
UNITED STATES PATENTS

| | | | |
|---|---|---|---|
| 3,607,452 | 9/1971 | Marosi | 148—6.27 X |
| 3,634,078 | 11/1972 | Uhlig | 148—6.27 X |

EDWARD G. WHITBY, Primary Examiner

U.S. Cl. X.R.

117—127, 132 BF; 156—22